(12) United States Patent
Allaire et al.

(10) Patent No.: US 9,945,418 B1
(45) Date of Patent: Apr. 17, 2018

(54) THRUST AND RADIAL MAGNETIC BEARINGS USING COMBINED ELECTROMAGNETIC AND PERMANENT MAGNETIC FLUX PATHS

(71) Applicants: Paul Allaire, Charlottesville, VA (US); Brad Nichols, Baltimore, MD (US); Tim Dimond, Charlottesville, VA (US); Jianming Cao, Mississauga (CA)

(72) Inventors: Paul Allaire, Charlottesville, VA (US); Brad Nichols, Baltimore, MD (US); Tim Dimond, Charlottesville, VA (US); Jianming Cao, Mississauga (CA)

(73) Assignee: Rotor Bearings Solutions International, LLC, Charlottesville, VA (US)

( * ) Notice: Subject to any disclaimer, the term of this patent is extended or adjusted under 35 U.S.C. 154(b) by 6 days.

(21) Appl. No.: 15/224,566

(22) Filed: Jul. 31, 2016

(51) Int. Cl.
*F16C 32/04* (2006.01)
*H02K 7/09* (2006.01)

(52) U.S. Cl.
CPC ........ *F16C 32/0465* (2013.01); *F16C 32/048* (2013.01); *F16C 32/0476* (2013.01); *H02K 7/09* (2013.01)

(58) Field of Classification Search
CPC ................ F16C 32/0465; F16C 32/048; F16C 32/0476; H02K 7/09
See application file for complete search history.

(56) References Cited

U.S. PATENT DOCUMENTS

| | | | |
|---|---|---|---|
| 3,865,442 A | 2/1975 | Studer | |
| 3,890,019 A | 6/1975 | Boden | |
| 3,937,148 A | 2/1976 | Simpson | |
| 3,955,858 A | 5/1976 | Poubeau | |
| 5,003,211 A | 3/1991 | Groom | |
| 5,250,865 A | 10/1993 | Meeks | |
| 5,514,924 A | 5/1996 | McMullen | |
| 5,804,899 A | 9/1998 | Jamain | |
| 6,015,272 A * | 1/2000 | Antaki | F04D 3/02 415/900 |
| 6,268,674 B1 * | 7/2001 | Takahashi | F16C 32/0446 310/261.1 |
| 6,302,661 B1 * | 10/2001 | Khanwilkar | F04D 13/0646 415/900 |
| 6,359,357 B1 * | 3/2002 | Blumenstock | F16C 32/0465 310/90.5 |
| 6,394,769 B1 * | 5/2002 | Bearnson | F04D 13/0646 415/900 |
| 6,603,230 B1 | 8/2003 | Abel | |
| 6,700,258 B2 | 3/2004 | McMullen | |
| 6,727,617 B2 | 4/2004 | McMullen | |
| 6,794,780 B2 | 9/2004 | Silber | |

* cited by examiner

*Primary Examiner* — Michael C Zarroli
(74) *Attorney, Agent, or Firm* — Michael Haynes PLC; Michael N. Haynes

(57) ABSTRACT

A system, machine, device, manufacture, circuit, and/or a method that can comprise and/or relate to active thrust bearings and/or active radial bearings that each utilize electromagnetic and permanent magnetic flux paths that can influence a location of a shaft of a rotating machine in response to internal and/or external forces applied to the shaft.

17 Claims, 8 Drawing Sheets

THRUST AND RADIAL MAGNETIC BEARINGS USING COMBINED ELECTROMAGNETIC AND PERMANENT MAGNETIC FLUX PATHS

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DETAILED DESCRIPTION

Figure 1:
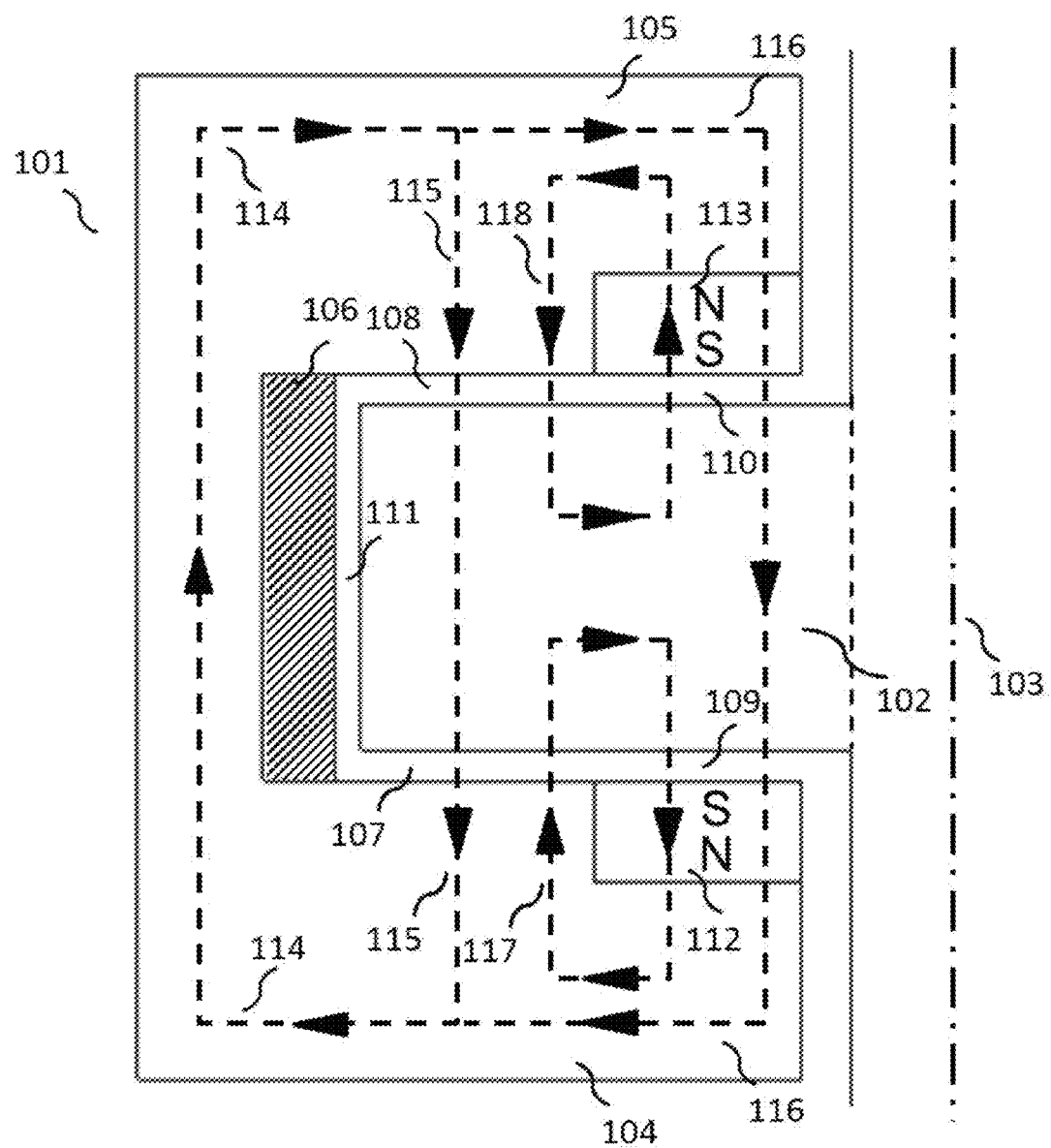
FIG. 1 is a schematic of an exemplary embodiment of an active magnetic thrust bearing invention with co-incident distal permanent magnet rings to generate an upward force on the target

Many rotating machines utilize active magnetic bearings. These machines include compressors, electric motors, turbines, waste heat generators, turbo expanders, generators, energy storage flywheels, pumps, and artificial heart pumps, among many others. Active magnetic bearing configurations can be categorized in at least the following ways: 1) independent axial and radial axis flux path bearings, 2) conical bearings which combined axial and radial axes, 3) combination bearings where axial and radial flux paths are not independent of each other, and/or 4) combined electromagnetic and permanent magnetic bearings where magnetic fluxes are generated by a combination of electromagnetic coils and permanent magnets. The independent axis system configuration can separate the active magnetic bearing configuration into two axial magnetic actuators, each with multiple active poles, on either side of a thrust disk, and multiple radial magnetic actuators, each with multiple active poles, arrayed radially around the shaft.

Certain exemplary embodiments can provide a thrust and/or radial active magnetic bearing system for rotating machinery using a combination of electromagnetic and permanent magnet flux paths. The non-rotating components of the magnetic bearing can be located in the non-rotating parts of the rotating machine (stator) while the rotating components of the magnetic bearings can be located on, in, and/or attached to the rotor. The magnetic bearings can include a thrust magnetic bearing that can oppose axial (thrust) external forces (e.g., a static force such as gravity and/or dynamic forces that can arise due to rotation of the rotor (e.g., centrifugal forces)) acting on the rotor and/or a radial magnetic bearing that can oppose radial (lateral) external forces acting on the rotor. The magnetic bearings can be arranged such that permanent magnetic components provide approximately constant bias magnetic flux in the magnetic bearing configurations. The bias magnetic flux provided by the permanent magnet components can ensure linear control operation of the bearing while requiring no electrical power input. An electromagnetic component comprising a coil winding can provide a time-varying magnetic control flux, which can generate the bearing forces required to oppose the time-varying external forces exerted on the rotor during operation. The time-varying electromagnetic control flux can add to the approximately constant permanent magnetic bias flux on one side of the shaft target control axis, while subtracting from the approximately constant permanent magnetic bias flux on the opposing side of the shaft target control axis to generate the required opposition to the external forces acting on the shaft. Certain exemplary embodiments of the active magnetic bearing system can be configured to minimize the required number of power sources (such as power amplifiers). Certain exemplary embodiments can be configured to provide a shortened axial and/or radial length of the axial bearing, which can improve rotor dynamics design in rotating machinery applications. To this end, the permanent magnetic materials used to provide the approximately constant bias magnetic flux can be embedded directly into, attached to, or partially surrounded by the thrust bearing back iron structure and/or the radial bearing back iron structure, sharing much of the control flux path, rather than placed in separate extrusions away from the control coil flux paths in the bearings. With this arrangement, any gap or separation between a permanent magnet and the adjacent back iron can have a uniform or non-uniform thickness ranging from approximately 0 to approximately 0.1 mm, such as approximately 0.05 mm, 0.078 mm, 0.1 mm, etc. That gap can be occupied by a non-magnetic material, such as air, non-ferrous metal, polymer, plastic, rubber, nylon, silicone, ceramic, and/or glue, etc. Note that the permanent magnet flux paths and/or the electromagnet flux paths can be substantially uniform in width.

Permanent magnetic flux levels can be determined by the demagnetization curve, which is a specific magnetic feature of each permanent magnetic material. Certain exemplary embodiments can be configured to utilize a selected permanent magnetic material operating point along the demagnetizing curve such that the applied electromagnetic magnetic flux passing through the bearing permanent magnetic materials is low enough to allow for operation along the demagnetization curve without demagnetizing the permanent magnetic material. The combined electromagnetic control and permanent magnetic bias system force capacity can be maximized, while minimizing the physical size of the bearings by careful design for both the axial and radial bearings. Also, the combined electromagnetic and permanent magnetic thrust and radial active magnetic bearings can have significantly reduced power consumption and/or a reduced number of power amplifiers.

Certain exemplary embodiments can provide improved separable axial (thrust) and radial (lateral) magnetic bearings that can utilize combination electromagnetic and permanent magnet flux path configurations that can minimize the physical size envelope (i.e., axial and radial dimensions) of the bearings while maximizing magnetically-generated positioning forces that create separation and/or an "airgap" between the bearings and the rotor. Note that any "airgap" described herein need not contain air or only air, but in certain embodiments can be filled or partially filled with a fluid, such as air, nitrogen, carbon dioxide, and/or steam, etc. The thrust bearing configuration can involve the coincidence of the electromagnetic and permanent magnet flux paths in the soft ferrous material of the bearing stator and thrust disk, as well as the permanent magnet materials. Instead of requiring a largely non-coincident separation of electromagnetic and permanent magnet flux paths, certain exemplary embodiments can be configured to increase the coincidence of the magnetic flux paths such that a portion of the electromagnetic flux path passes through the permanent magnets. This coincidence can be achieved by the direct colocation of the permanent magnet materials and soft iron stator material, eliminating both the axial space associated with soft iron pole and permanent magnet extrusions and the radial space separating the extrusions, and thus reducing the axial and radial size of the thrust bearing.

The permanent magnets in this configuration can be sized to operate at an optimal, nominal operating point on the demagnetization curve of magnetic flux density versus magnetic field intensity such to minimize the size of the magnetic bearing while maximizing the airgap positioning forces. Additionally, the optimal, nominal operating point in this configuration can be carefully selected to allow for changes of the operating point of the permanent magnet material over some range along the curve. As a portion of the time-varying electromagnetic control flux passes through the permanent magnet material in different directions, the operating point of the permanent magnets moves up and down the curve about the nominal operating point. The optimal, nominal operating point can be carefully chosen to avoid demagnetization of the permanent magnetic material on one end of the demagnetization curve while avoiding the permanent magnet material flux density saturation point on the other end of the demagnetization curve, beyond the remnant magnetic flux density.

Certain exemplary embodiments can reduce the required number of power amplifiers necessary for operation. Also, the required control current levels in the optimized combination electromagnetic/permanent magnet bearings can be reduced, because of the use of permanent magnetic bias fluxes, allowing for reduced size amplifiers and lower power consumption due to lower coil resistance power losses. Further, the number of required electromagnetic coils can be reduced in certain exemplary embodiments.

In certain exemplary embodiments, the active magnetic separable radial bearing can use a similar principle to place the permanent magnet bias components at the internal ends of one half of the radial bearing electromagnetic poles, which can create the permanent magnetic bias flux for the radial bearing in the same physical plane as the electromagnetic radial poles, enabling an axially short radial bearing. The permanent magnetic flux loops can pass through the adjacent electromagnetic poles and/or can be co-incident with the electromagnetic flux passing through the same poles. The electromagnetic radial poles and associated electromagnetic coils can generate the necessary vertical and/or horizontal radial forces to radially center the shaft in two orthogonal planes against the external loads acting on the shaft in the magnetic bearing supported machine while having a small axial length. Certain exemplary embodiments can reduce the axial length of the radial magnetic bearings, which can simplify rotor dynamic and/or radial bearing control issues in active magnetic bearings.

Certain exemplary embodiments can provide combined electromagnetic and permanent magnetic flux path thrust bearing system, machine, and/or device, such as shown in FIG. 1 and is denoted as configuration 101. This illustrated embodiment concerns the thrust bearing first while the radial bearing is considered later herein. To clarify orientation, this figure and discussion assume that axis of rotation (i.e., the longitudinal axis) of the shaft extends substantially vertically, such that the top of the page is "upwards" of the bottom of the page. Certain exemplary embodiments can generate a large upward (or downward) force or "thrust" on the thrust bearing disk 102 while the radial and axial length of the thrust bearing is kept relatively small by direct co-location of the permanent magnetic rings 112 and 113 with the thrust bearing stator. The thrust disk 102 is shown attached to the rotating shaft 103. It is noted that only the left hand side of the thrust bearing is presented in FIG. 1 and is considered symmetric about the shaft 103 centerline. An upper soft ferrous magnetic component 105 can be attached to and/or integral with a lower soft ferrous magnetic component 104 to form at least a portion of the stator (non-rotating part) of the thrust bearing configuration. This soft ferrous magnetic material can have the physical property of a maximum linear magnetic flux density (magnetic flux divided by the cross sectional area through which the magnetic flux passes), in example simple non-dimensional terms of B_FE. A single coil 106 can be attached to the stator and/or can circle(s) the thrust disk with a radial airgap 111, to allow for rotation of the thrust disk inside of the thrust bearing stator, as shown. The electrical current direction developed in the coil 106 by the power amplifier can be bi-directional, flowing either into or out of the plane of the drawing. The thrust disk has five illustrated airgaps, 107, 108, 109, 110, two on each side, and a radial airgap 111 that allows for the thrust disk 102 to rotate freely, even when the radial airgap is reduced from approximately 5-10 mm down to approximately 0.5-2 mm. There can be two permanent magnet rings 112 and 113 co-located inside of the lower and upper stator components 104 and 105, and/or located at the fully distal position relative to the coil 106, for a shortened axial and/or radial length configuration. As shown, upper airgap 108, with example non-dimensional area A_108, can be located between the upper soft ferrous stator 105 and the thrust disk 102, and/or upper airgap 110, with example non-dimensional area A_110, can be located between the upper permanent magnet 113 and the thrust disk 102, these airgaps allowing for free rotation of the thrust disk 102. Likewise, lower airgap 107, with non-dimensional area A_107, can be located between the lower soft ferrous stator 104 and the thrust disk 102, and/or lower airgap 109, with non-dimensional area A_109, can be located between the lower permanent magnet ring 112 and the thrust disk 102, can allow for rotation of the thrust disk 102.

There are two types of magnetic flux loops shown in configuration 101: electromagnetic flux loops 114, 115, and 116, as well as permanent magnet flux loops 117 and 118. The electromagnetic flux loops 114, 115, 116 can be generated by introducing current to the coil 106. The upward electromagnetic flux 114 next to coil 106 can be separated into two downward fluxes: downward flux 115 passing through the upper airgap 108 and lower airgap 107, and downward flux 116 passing through the upper permanent magnet ring 113 and lower permanent magnet ring 112. The upper permanent magnet bias flux loop 118, can be generated by the permanent magnet ring 113, and/or can pass through the upper airgaps 108 and 110. The electromagnetic control flux 115 can add to the permanent magnet bias flux 118, resulting in a large magnetic flux value in the upper airgap 108 that can generate a large upward attractive magnetic force acting on the upper side of the thrust disk 102. The lower permanent magnet flux loop 117 can pass through the lower airgaps 107 and 109. The electromagnetic control flux 115 can nearly cancel the permanent magnetic bias flux 117, resulting in a very small magnetic flux value in the lower airgap 107 that can generate nearly zero downward attractive magnetic force acting on the lower side of the thrust disk 102. The electromagnetic control flux loop 116 passing through the permanent magnetic rings 112 and 113 can have a relatively small magnetic flux while the permanent magnetic flux values 117 and 118 can be relatively large; therefore, the upward attractive force on the thrust disk 102 in the upper airgap 110 can be approximately equal to the downward attractive force in the lower airgap 109, resulting in a net force of nearly zero acting on the thrust disk 102 in airgaps 109 and 110.

Figure 2:
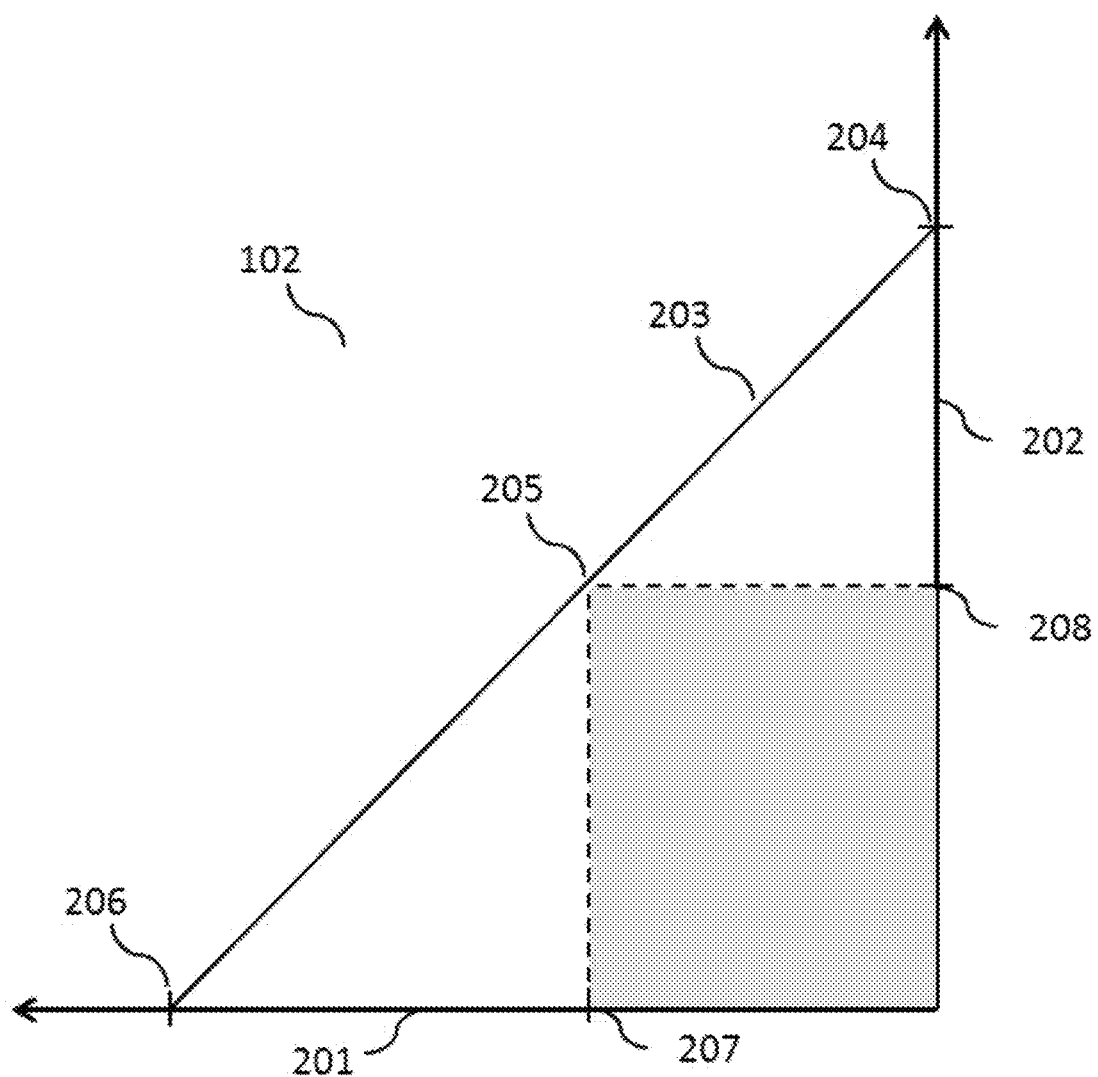
FIG. 2 is an exemplary embodiment of a demagnetizing curve for permanent magnet materials

The permanent magnet rings 112 and 113 can have magnetic operating points, in terms of magnetic flux density B and the magnetic field intensity H, as determined by the design placement along the example permanent magnet demagnetizing curve as shown in FIG. 2 and drawing 102. The permanent magnetic field intensity, H, 201 is plotted on the horizontal axis while the permanent magnetic flux density, B, 202 is plotted on the vertical axis. The demagnetizing curve 203 gives a plot of the range of magnetic field intensities and magnetic flux densities that the permanent magnet can operate over without reaching the demagnetizing magnetic field intensity 206, expressed as an example non-dimensional value H_max, and/or without exceeding the remnant magnetic flux density 204, which is expressed in an example non-dimensional term B_max. Due to the co-incidence of the permanent magnetic and electromagnetic flux paths in certain exemplary embodiments, small variations in the permanent magnetic ring properties can occur as the electromagnetic control flux passes through the permanent magnets. An exemplary operating point for the permanent magnet is seen at the point 205, has an operating magnetic flux density 208, with a dimensionless value B_PM and a magnetic field intensity 207, with non-dimensional value H_PM. Thus, the maximum net downward axial positioning force on the thrust disk 102 is given by an example non-dimensional value F_max=B_FE^2×A_107, due to a maximum flux density in the airgap 107.

Figure 3:
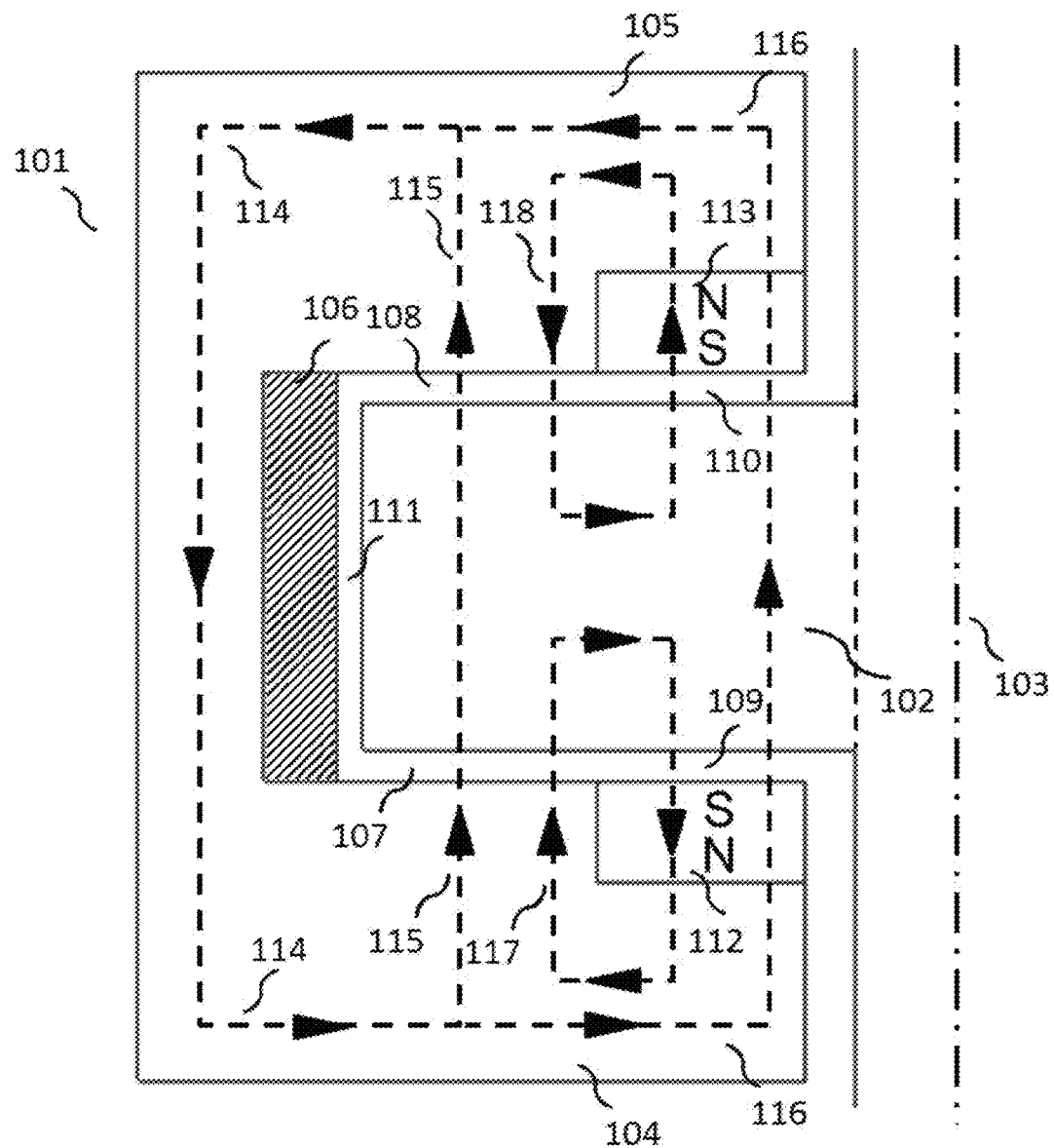
FIG. 3 is a schematic of an exemplary embodiment of an active magnetic thrust bearing with co-incident distal permanent magnet rings to generate a downward force on the target

As described next using FIG. 3, the maximum downward force on the thrust disk can be obtained by reversing the current flow in the electromagnetic coil 106, so that the current direction into or out of the coil plane is changed. Note that this differs from the situation where the total mono-directional current is either increased or decreased but the coil current into or out of the plane of the coil 106 is not actually changed from into the plane or out of the plane. The use of the permanent magnet rings means that the thrust bearing design can be electrically efficient because the magnetic bias used to linearize the thrust bearing operation can have no electrical power cost as it is provided with permanent magnet rings 112 and 113. There need be only one coil 106, so there need be only one bi-directional amplifier to power this thrust bearing rather than two mono-directional power amplifiers. The thrust bearing configuration of certain exemplary embodiments can be much shorter axially and/or radially because the permanent magnet rings can be co-located directly into the soft ferrous magnetic stator components instead of physically distanced from the extruded electromagnetic components. When the permanent magnets are co-located in the soft iron stator, the resulting electromagnetic and permanent magnetic flux paths can be designed to be significantly co-incident.

Figure 4:
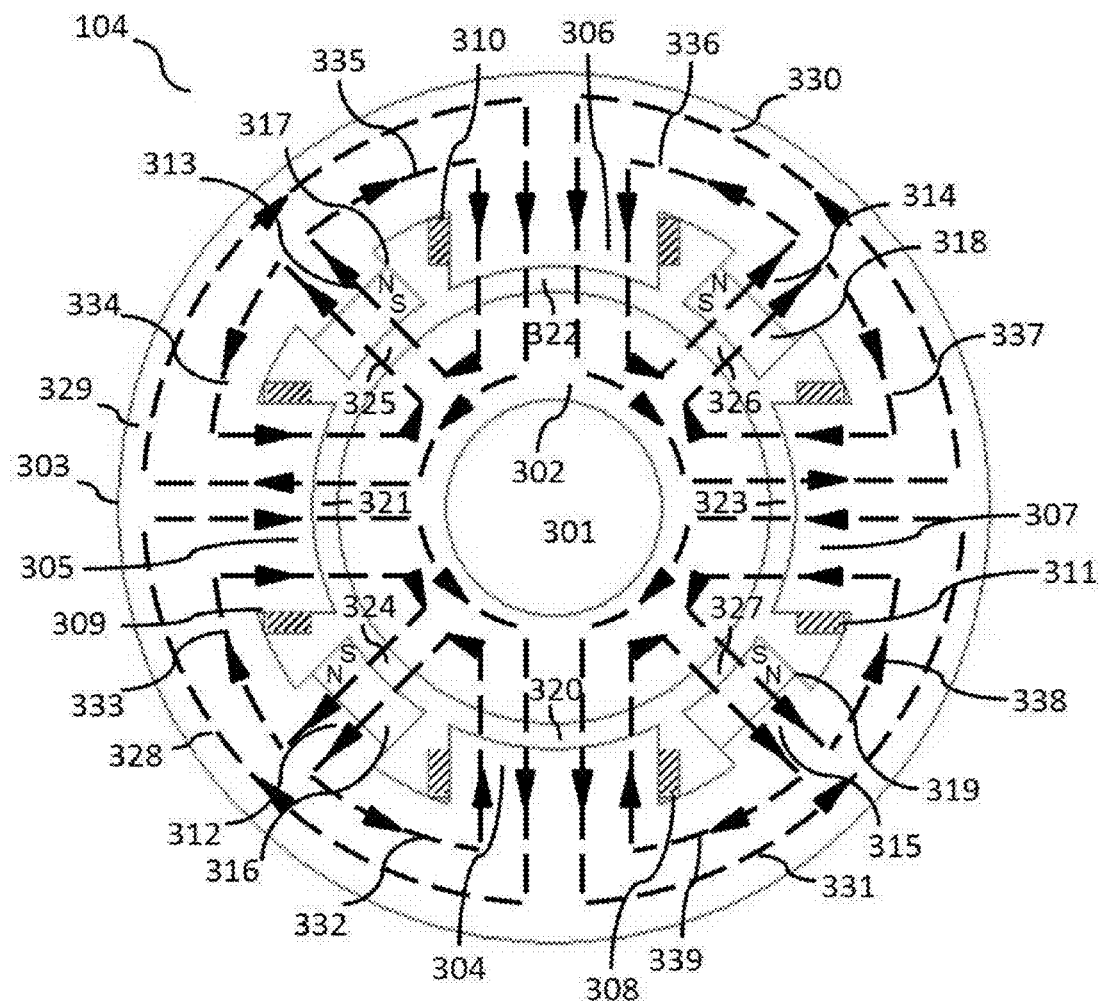
FIG. 4 is a schematic of an exemplary embodiment of an active magnetic radial bearing with permanent magnet bias components in alternating poles to generate an upward force on the target

Certain exemplary embodiments can provide a radial active magnetic bearing with combined electromagnetic and permanent magnetic flux, as illustrated in FIG. 4 in configuration 104. To clarify orientation, this figure and discussion assume that axis of rotation (i.e., the longitudinal axis) of the shaft extends substantially horizontally and in and out of the plane of the page, such that the top of the page is "upwards" of the bottom of the page. A soft iron magnetic cylindrical target 302 of axial length L can be fixed to the rotor (rotating shaft) 301, such as with a mechanical shrink fit, and/or can comprise thin laminations to reduce eddy currents. As illustrated, the radial active magnetic bearing has a stator (non-rotating component), which can be comprised of a circular back iron 303, four electromagnetic poles 304, 305, 306, 307, and four permanent magnetic poles 312, 313, 314, 315. Like the target, the stator and/or back can be composed of a soft iron magnetic material and/or can comprise a stack of thin laminations to reduce eddy currents. Radial airgaps 320, 321, 322, 323, 324, 325, 326, 327 between the electromagnetic poles 304, 305, 306, 307 and permanent magnet poles 312, 313, 314, 315 can allow for non-contact rotation of the magnetic target 302 and shaft 301 within the bearing.

The four electromagnetic poles, with a designed axial length L_EM, circumferential width W_EM, and internal radius of R_EM, can be energized to produce electromagnetic fluxes 328, 329, 330, 331 within the poles using coil windings 308, 309, 310, 311. Coils 308 and 310 can be wired together in series to control the vertical axis, as shown in FIG. 4, while coils 309 and 311 can be wired together in series to control the horizontal axis. The electromagnetic flux loops 328, 329, 330, 331 can pass through the back iron 303 and/or can complete the electromagnetic flux circuit through the adjacent electromagnetic poles and target material 302. The four permanent magnetic poles 312, 313, 314, 315 can have permanent magnetic components 316, 317, 318, 319, with a designed axial length L_PM, circumferential width W_PM, and internal radius R_PM, which can be incorporated into the end structure of the poles as illustrated in FIG. 4. The permanent magnet components 316, 317, 318, 319 can generate the permanent magnet bias flux paths 332, 333, 334, 335, 336, 337, 338, 339 that can either add to or subtract from the electromagnetic flux paths 328, 329, 330, 331 in the airgaps 320, 321, 322, 323 between the electromagnetic poles 304, 305, 306, 307 and the target material 302.

To achieve the maximum vertical radial positioning force on the magnetic target 302, coils 308 and 310 can be energized while coils 309 and 311 are turned off. The resulting vertical force can be primarily generated in the upper airgap 322, with non-dimensional pole face area A_322=L_EM×W_EM, where the electromagnetic flux loops 329 and 330 from energized coil 310 can add to the permanent magnet bias flux loops 335 and 336 generated by the adjacent permanent magnets 317 and 318. The resulting flux density in airgap 322, B_322 can generate a large attractive upward magnetic force. In the opposing lower airgap 320, the electromagnetic flux loops 328 and 331 from energized coil 308 can approximately cancel the permanent magnet bias flux loops 332 and 339 generated by the adjacent permanent magnets 316 and 319. The resulting flux density in airgap 320 can be near zero and/or can generate a near zero vertical positioning force. The resulting flux densities in the non-energized electromagnet poles' 305, 307 airgaps 321, 323 need not contribute to the vertical positioning force and/or can approximately cancel each other in the horizontal direction resulting in an approximately zero horizontal positioning force. Similarly, a maximum downward force can be achieved by reversing the current direction in coils 308 and 310 such that electromagnetic and permanent magnet bias flux paths add in airgap 320 and approximately cancel in airgap 322. Horizontal positioning forces can be achieved in a similar manner by energizing coils 309 and 311.

The combined final results in airgaps 322, 320, 321, 323 can yield the upper vertical positioning force, with example non-dimensional value $F\_322=(B\_322)^2 \times A\_322$ or $F\_322=B\_FE^2 \times A\_322$ for this combined electromagnetic and permanent magnet activation acting on the magnetic target 302.

Any of the four permanent magnet flux airgaps 324, 325, 326, 327, can have larger or smaller airgap areas than the electromagnetic airgap areas. All of these airgaps can have an approximately constant bias flux density B_PM and/or the net attractive magnetic force acting on the target due to airgaps 324, 325, 326, 327 can have a value close to zero in both perpendicular control axis directions.

Certain exemplary embodiments can require only half as many power amplifiers operating in bi-direction current mode, lowering the cost of the active magnetic bearing. As previously discussed, the two electromagnetic coils 308 and 310, corresponding to the generation of combined magnetic fluxes in airgaps 322 and 320, can be wired in series such that only one power amplifier operating in bi-directional current mode is needed to generate the electromagnetic flux paths and resulting radial positioning force in these two airgaps 322 and 320. A similar pairing can be employed with electromagnetic coils 309 and 311 to generate electromagnetic flux paths in the two airgaps 321 and 323 in the orthogonal coordinate direction resulting in the need for one additional bi-directional amplifier. In certain exemplary embodiments, the electromagnetic poles and permanent magnetic poles in the present invention can be all located in the same axial plane, which can enable a smaller axial active magnetic bearing length while simultaneously increasing the electrical efficiency by employing the permanent magnet bias design concept.

Figure 5:
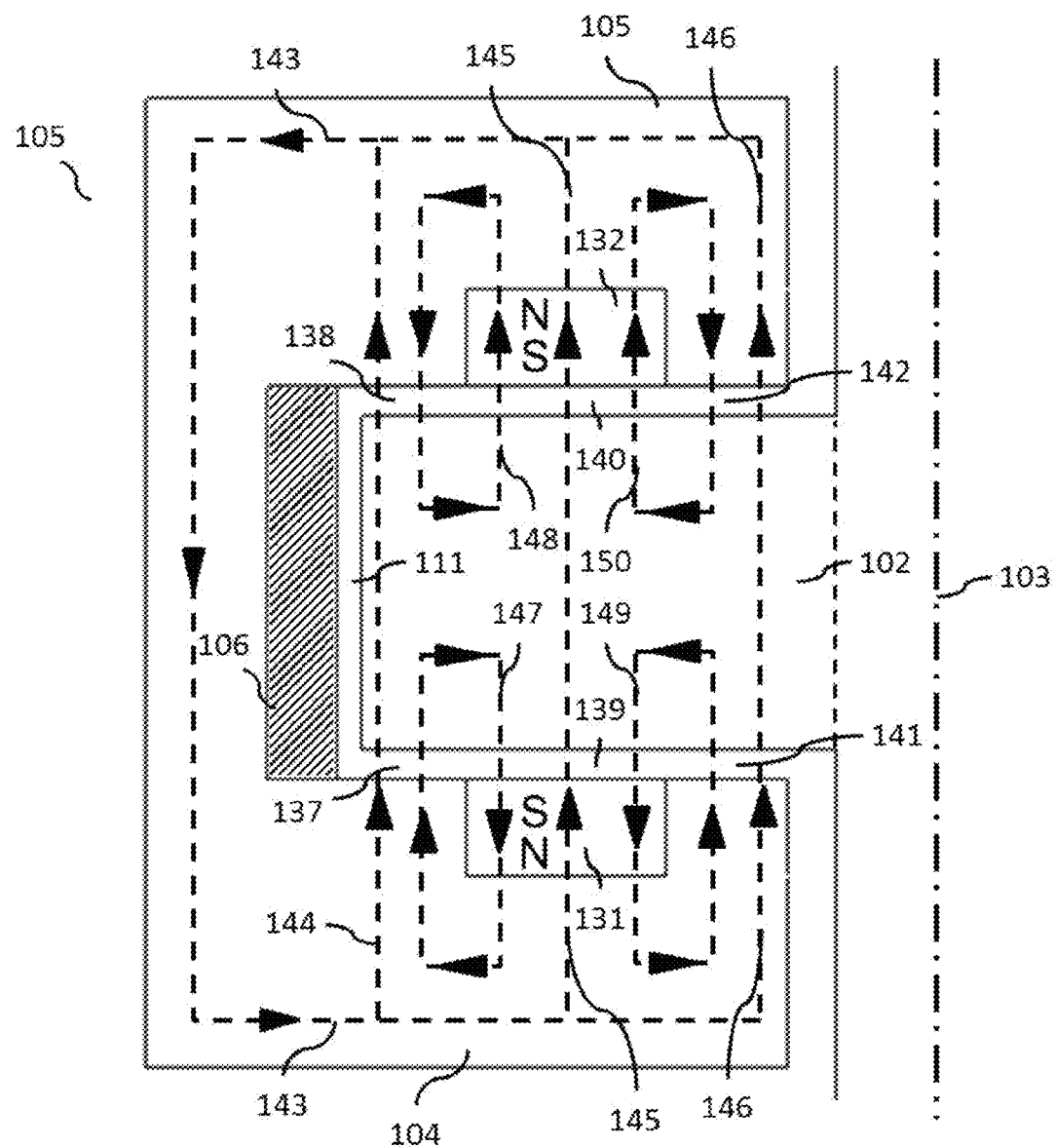
FIG. 5 is a schematic of an exemplary embodiment of a modified active magnetic thrust bearing with co-incident partially distal permanent magnet rings to generate an upward force on the target

FIG. 5 illustrates an alternative thrust bearing configuration 105. In this illustrated configuration, the permanent magnet components 131 and 132 can be collocated in the upper and lower soft iron stator components 104 and 105 such that two airgaps on either side of each permanent magnet exist between the soft iron stator components and the thrust disk 102. In this alternative thrust bearing configuration, the permanent rings can be partially distal from the coil 106. Airgaps 138 and 142 can be located between the upper soft iron stator component 105 and the thrust disk 102 while airgaps 137 and 141 can be located between the lower soft iron stator component 104 and the thrust disk 102. The electromagnetic control flux path 143 generated by coil winding 106 can return through the thrust disk through three flux paths: flux paths 144 and 146 that pass through the soft iron material airgaps, and flux path 145 that passes through the permanent magnet material. This configuration 105 can operate under similar principles as the embodiment illustrated in FIG. 1, configuration 101. This configuration 105, can further increase the coincidence of the permanent magnet and electromagnetic flux paths.

Figure 6:
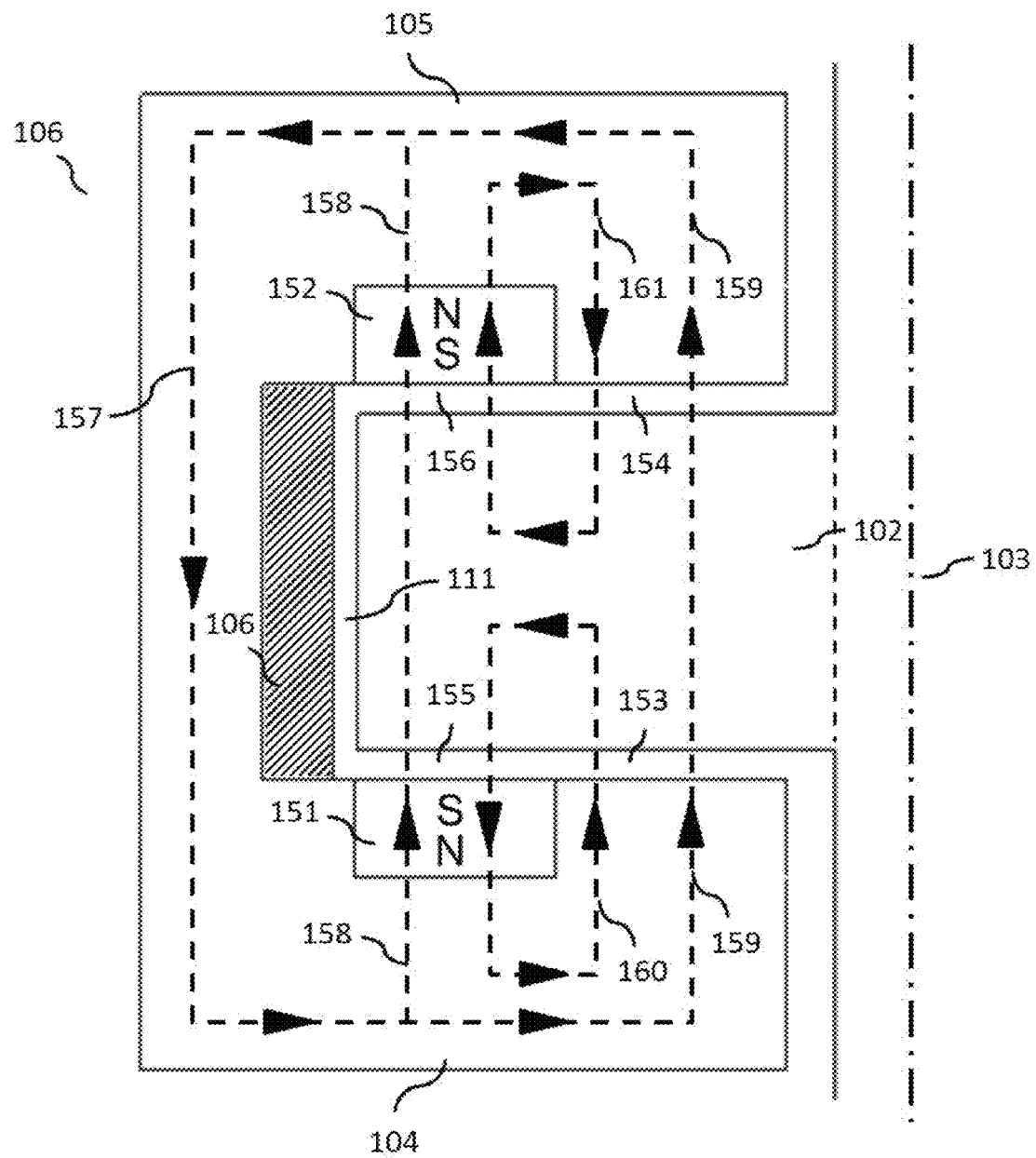
FIG. 6 is a schematic of an exemplary embodiment of a modified active magnetic thrust bearing with co-incident adjacent permanent magnet rings to generate an upward force on the target

FIG. 6 illustrates another alternative thrust bearing configuration 106. In this illustrated configuration, the permanent magnet components 151 and 152 can be collocated in the upper and/or lower soft iron stator components 104 and 105 positioned closest to the coil winding 106 such that one soft iron airgap exists in a position closest to the shaft 103 beside each permanent magnet 151 and 152 between the soft iron stator components and the thrust disk 102. The permanent magnetic rings can be adjacent to the coil 106. Airgap 154 can be located between the upper soft iron stator component 105 and the thrust disk 102 while airgap 153 can be located between the lower soft iron stator component 104 and the thrust disk 102. The electromagnetic control flux path 157 generated by coil winding 106 can return through the thrust disk through two flux paths: flux path 159 that passes through the soft iron material airgaps 153 and 154 closest to the shaft 103, and flux path 158 that passes through the permanent magnet material. This configuration 106 can operates under similar principles as the embodiment illustrated in FIG. 1, configuration 101. This configuration 106, can further increase the coincidence of the permanent magnet and electromagnetic flux paths.

Figure 7:
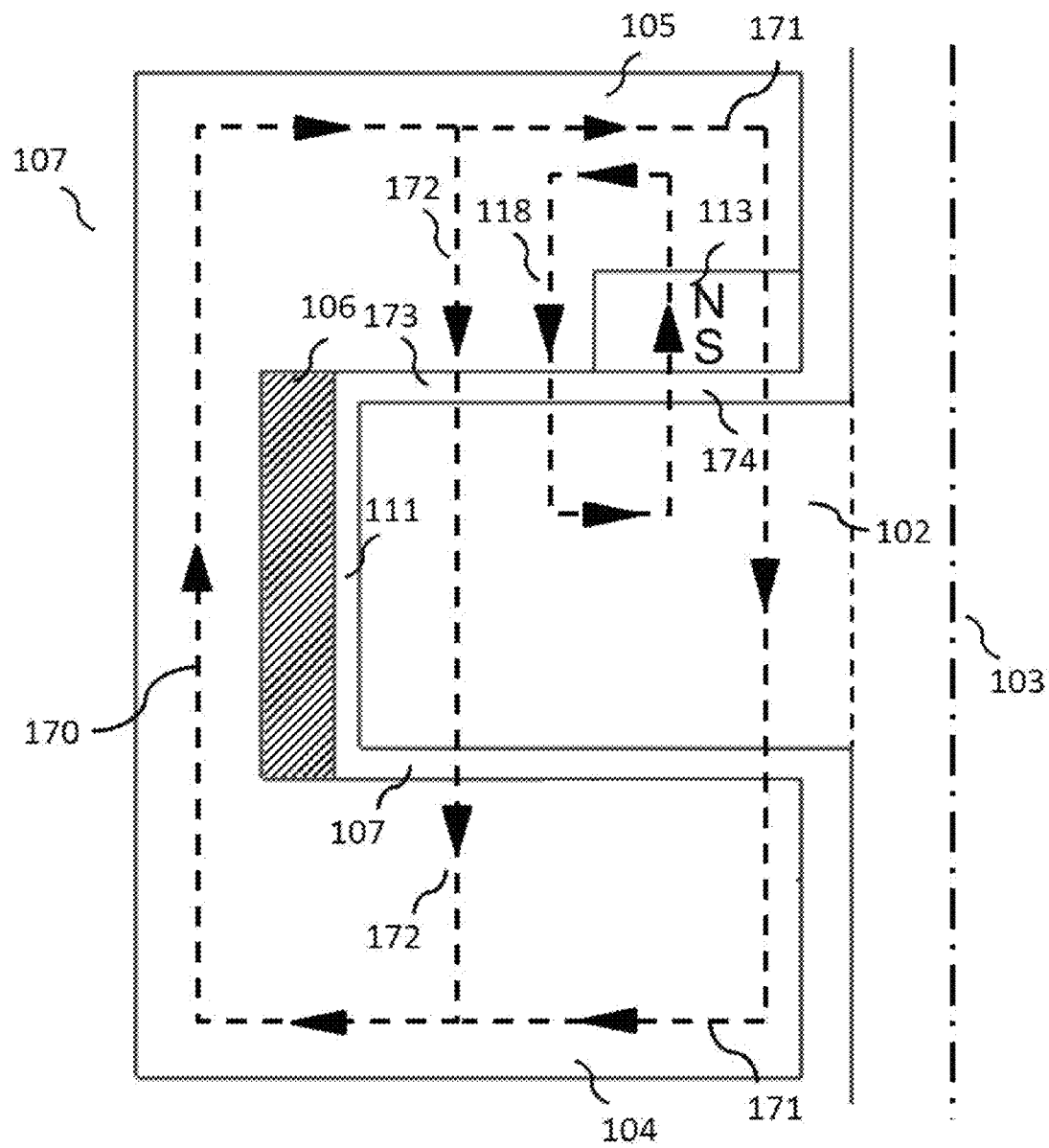
FIG. 7 is a schematic of an exemplary embodiment of a modified active magnetic thrust bearing with permanent magnetic bias component for single sided operation

FIG. 7 illustrates another alternative thrust bearing configuration 107. This illustrated configuration can generate the magnetic force in only the upward direction for applications where this is desired. In this configuration, only one permanent magnet 113 need be used to provide permanent magnet bias flux 118. This configuration 107, can operate under similar principles as the embodiment illustrated in FIG. 1, configuration 101, however it is only considered one-sided. As shown in FIG. 7, this configuration 107 can exert a force on the thrust disk 102 in only a single direction. As shown in FIG. 7, the coil winding 106 can produce the electromagnetic control flux 172 that adds to the permanent magnet bias flux 118 in the soft iron airgap 173 located between the upper soft iron stator component 105 and the thrust disk 102, which can produce a net upward force on the thrust disk. The permanent magnet 113 in this configuration 107 can be repositioned within the upper soft iron stator component 105 such as shown in the two-sided acting configurations 105 and 106.

Figure 8:
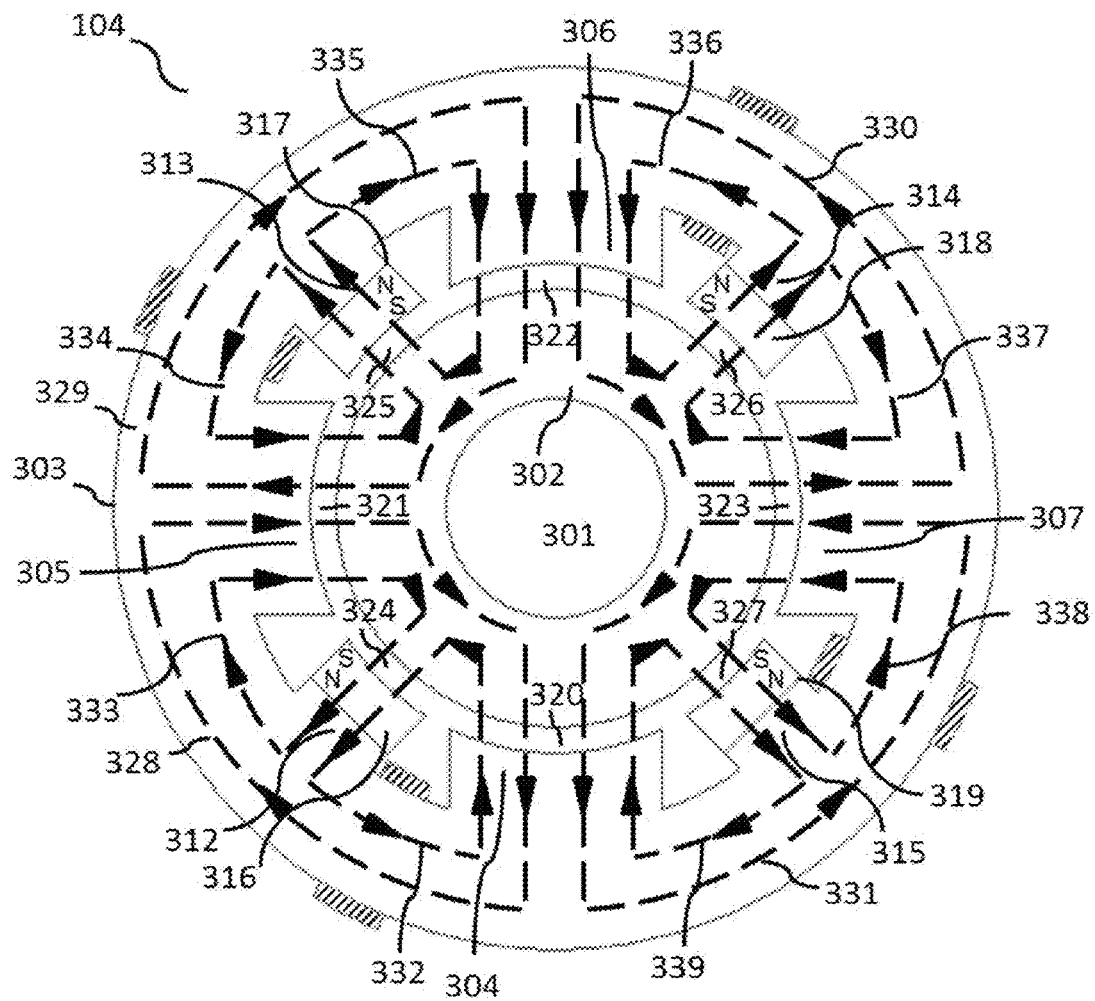
FIG. 8 is an exemplary embodiment of a modified radial bearing.

FIG. 8 presents an alternative radial bearing configuration 108. As illustrated, the electromagnetic coils 408, 409, 410, and 411 can be wound around the circular back iron 303.

Certain exemplary embodiments can comprise a machine comprising:
  a thrust bearing that comprises:
    a soft iron stator configured to operably partially surround a thrust disk while operably allowing the thrust disk to rotate within the stator;
    an electromagnetic coil attached to, embedded in, or partially surrounded by the stator, the coil configured to operably encircle the thrust disk; and/or
    at least one permanent magnetic ring attached to, embedded in, or partially surrounded by the stator, the stator and configured to operably surround a rotor that is coupled to the thrust disk;
  the thrust disk;
  the rotor; and/or
  a power source configured to operably provide a switchably bi-directional current to the coil;
  wherein:
    the soft iron stator is defined by an upper portion and a lower portion that is attached to or integral with the upper portion;
    an upper gap is operably defined between the upper portion and the thrust disk;
    a lower gap is operably defined between the lower portion and the thrust disk;

each of the at least one permanent magnetic ring is configured to operably generate a permanent magnetic flux path that passes through at least one of the upper gap and the lower gap;

the electromagnetic coil is configured to operably generate an electromagnetic flux path that passes through the upper gap and through the lower gap;

the thrust bearing is configured to operably position the electromagnetic flux path substantially coincidently with each of the at least one permanent magnetic flux paths;

each of the at least one permanent magnetic rings is located partially distal in the stator with respect to the coil, such that the upper gap comprises a proximal upper gap portion and a distal upper gap portion;

each of the at least one permanent magnetic rings is located adjacent to the coil;

each of the at least one permanent magnetic rings is located in the stator in a position configured to operably cause the electromagnetic flux path to be substantially co-incident with each of the at least one permanent magnetic paths;

the electromagnetic flux path operably passes through each of the at least one permanent magnetic rings;

the upper gap and the lower gap are substantially filled by a fluid;

the upper gap and the lower gap are substantially filled by a non-magnetic sleeve; and/or the upper gap has a non-magnetic portion between the soft iron portion of the upper portion of the stator and the permanent magnetic ring and the lower gap has a non-magnetic portion between the soft iron portion of the lower portion of the stator and the permanent magnetic ring;

Certain exemplary embodiments can comprise a machine comprising:

a radial bearing that comprises:
a stator comprising:
a soft iron back;
a plurality of radial electromagnetic poles;
a plurality of electromagnetic coils, each electromagnetic coil encircling a corresponding electromagnetic pole from the plurality of electromagnetic poles;
a plurality of permanent magnet poles, each permanent magnet pole incorporating a permanent magnet into an end thereof;
the rotor; and/or
a plurality of power sources, each configured to operably provide a switchably bi-directional current to a corresponding one or more electromagnetic coils from the plurality of electromagnetic coils;
wherein:
the stator is configured to operably at least partially surround a soft iron cylindrical target coupled to a rotor while operably allowing the target to rotate within the stator;
the back comprises a stacked plurality of laminations;
a radial gap is operably defined between back and the target;
each of the plurality of electromagnetic coils is configured to operably generate an electromagnetic flux path through the corresponding electromagnetic pole, the back, the radial gap and the target;
each of the plurality of permanent magnets is configured to operably generate a permanent magnet flux path through the corresponding permanent magnet pole, the back, the radial gap and the target;

the radial bearing is configured to operably position at least one of the electromagnetic flux paths substantially coincidently with at least one of the permanent magnetic flux paths;

a radially opposing pair of electromagnetic coils from the plurality of electromagnetic coils is configured to operably share a single power source that is configured to provide a switchably bi-directional current;

the plurality of electromagnetic poles and the plurality of permanent magnet poles are located in a single axial plane; and/or the plurality of electromagnetic poles are wound around the iron back.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around and/or approximately.
above—at a higher level.
across—from one side to another.
activity—an action, act, step, and/or process or portion thereof.
adapt—to design, make, set up, arrange, shape, configure, and/or make suitable and/or fit for a specific purpose, function, use, and/or situation.
adapter—a device used to effect operative compatibility between different parts of one or more pieces of an apparatus or system.
adjacent—in close proximity to, near, next to, close, or contiguous; adjoining with little or no intervening space; neighboring; and/or within a horizontal radius of approximately 0.001 mm to approximately 2 mm, including all values and subranges therebetween.
after—following in time and/or subsequent to.
air—the earth's atmospheric gas.
along—through, on, beside, over, in line with, and/or parallel to the length and/or direction of; and/or from one end to the other of.
and—in conjuction with.
and/or—either in conjunction with or in alternative to.
any—one, some, every, and/or all without specification.
apparatus—an appliance or device for a particular purpose.
approximately—about and/or nearly the same as.
around—about, surrounding, and/or on substantially all sides of; and/or approximately.
as long as—if and/or since.
associate—to join, connect together, and/or relate.
at—in, on, and/or near.
at least—not less than, and possibly more than.
at least one—not less than one, and possibly more than one.
attached—joined or secured together.
axial—located on, around, or in the direction of an axis.
back—a part, portion, or area farthest from the front, and/or a part that supports and/or strengthens from the rear.

based on—indicating one or more factors that affect a determination, but not necessarily foreclosing additional factors that might affect that determination.
bearing—a device that supports, guides, and/or reduces the friction of motion between fixed and moving machine parts.
between—in a separating interval and/or intermediate to.
bi-directional—configured to flow (not necessarily simultaneously) in each of two opposite directions.
by—via and/or with the use and/or help of
can—is capable of, in at least some embodiments.
cause—to bring about, provoke, precipitate, produce, elicit, be the reason for, result in, and/or effect.
circuit—an electrically conductive pathway and/or a communications connection established across two or more switching devices comprised by a network and between corresponding end systems connected to, but not comprised by the network.
co-incident—occupying the same area in space and/or happening at the same time.
coil—(n) a conductor that creates a magnetic field due to the flow of electrical current therein and/or a continuous loop comprising two or more turns of electrically conductive material. (v) to roll and/or form into a configuration having a substantially spiraled cross-section.
composition of matter—a combination, reaction product, compound, mixture, formulation, material, and/or composite formed by a human and/or automation from two or more substances and/or elements.
comprises—includes, but is not limited to, what follows.
comprising—including but not limited to.
configure—to design, arrange, set up, shape, and/or make suitable and/or fit for a specific purpose, function, use, and/or situation.
configured to—having a structure that, during operation, will perform the indicated activity(ies). To the extent relevant to the current patent application, the use of "configured to" is expressly not intended to invoke 35 U.S.C. § 112(f) for that structure.
connect—to join or fasten together.
containing—including but not limited to.
convert—to transform, adapt, and/or change.
corresponding—related, associated, accompanying, similar in purpose and/or position, conforming in every respect, and/or equivalent and/or agreeing in amount, quantity, magnitude, quality, and/or degree.
couple—to join, connect, and/or link two things together.
coupleable—capable of being joined, connected, and/or linked together.
coupling—linking in some fashion.
create—to bring into being.
current—a flow of electrical energy.
cylindrical—of, relating to, and/or having the shape of a cylinder, especially of a circular cylinder.
define—to establish the meaning, relationship, outline, form, and/or structure of; and/or to precisely and/or distinctly describe and/or specify.
derive—to receive, obtain, and/or produce from a source and/or origin.
determine—to find out, obtain, calculate, decide, deduce, ascertain, and/or come to a decision, typically by investigation, reasoning, and/or calculation.
device—a machine, manufacture, and/or collection thereof.
disk—a thin, substantially flat, substantially circular object and/or plate.
distal—farther with respect to a point of reference, such as a portion of an extended hand that is further from the face.
each—every one of a group considered individually.
effective—sufficient to bring about, provoke, elicit, and/or cause.
electromagnetic—energy having a frequency within the electromagnetic spectrum and propagated as a periodic disturbance of the electromagnetic field when an electric charge oscillates or accelerates and/or one of the waves that are propagated by simultaneous periodic variations of electric and magnetic field intensity and that include radio waves, infrared, visible light, ultraviolet, X rays, and gamma rays.
embed—to fix firmly in a surrounding mass.
embodiment—an implementation, manifestation, and/or concrete representation.
encircle—to surround at least a portion of, in at least one plane.
estimate—(n) a calculated value approximating an actual value; (v) to calculate and/or determine approximately and/or tentatively.
exemplary—serving as an example, instance, and/or illustration.
filled—occupied substantially or completely.
first—a label for a referenced element in one or more patent claims, but that label does not necessarily imply any type of ordering to how that element (or any other elements of a similar type) is implemented in embodiments of the claimed subject matter.
flux—the lines of force of an electric or magnetic field; and/or the strength of a field in a given area expressed as the product of the area and the component of the field strength at right angles to the area.
for—with a purpose of.
from—used to indicate a source, origin, and/or location thereof.
further—in addition.
gap—an interruption of continuity; a space between objects and/or events.
generate—to create, produce, give rise to, and/or bring into existence.
given—
having—including but not limited to.
including—including but not limited to.
incorporating—causing to comprise.
initialize—to prepare something for use and/or some future event.
install—to connect or set in position and prepare for use.
integral—formed or united into another entity.
into—to a condition, state, or form of
is—to exist in actuality.
lamination—a thin sheet.
located—situated approximately in a particular spot, region, and/or position.
lower—in a low position relative to something else and/or lesser in magnitude in relation to something else.
machine—(n) a device, assembly, and/or system configured to perform at least one task. (v) to cut, shape, and/or finish via a machine.
magnetic—having the property of attracting iron and certain other materials by virtue of a surrounding field of force.
may—is allowed and/or permitted to, in at least some embodiments.
method—one or more acts that are performed upon subject matter to be transformed to a different state or thing and/or are tied to a particular apparatus, said one or more acts not a fundamental principal and not preempting all uses of a fundamental principal.

near—a distance of less than approximately [X].

no—an absence of and/or lacking any.

non—without and/or having none.

one—being and/or amounting to a single unit, individual, and/or entire thing, item, and/or object.

operable—practicable and/or fit, ready, and/or configured to be put into its intended use and/or service.

operably—when in effect, operative, and/or operating.

operative—when in operation for its intended use and/or service.

opposing—opposite; against; being the other of two complementary or mutually exclusive things; and/or placed or located opposite, in contrast, in counterbalance, and/or across from something else and/or from each other.

or—a conjunction used to indicate alternatives, typically appearing only before the last item in a group of alternative items.

outside—beyond a range, boundary, and/or limit; and/or not within.

pair—a set of two items.

partially—to a degree and/or extent, but not necessarily totally.

pass—to extend across and/or through.

path—closed loop containing a magnetic flux.

per—for each and/or by means of.

permanent magnet—an object that is made from a material that is magnetized and/or that creates its own persistent magnetic field.

plane—a surface containing all the straight lines that connect any two points on it.

plurality—the state of being plural and/or more than one.

pole—one of two or more (often opposing) regions in a magnetized body at which the magnetic flux density is concentrated.

portion—a part, component, section, percentage, ratio, and/or quantity that is less than a larger whole.

power—(n) energy, a measure of energy and/or work, and/or a rate at which work is done, expressed as the amount of work per unit time and commonly measured in units such as watt and horsepower; (v) to energize, such as via applying electricity.

pre-—a prefix that precedes an activity that has occurred beforehand and/or in advance.

predetermine—to determine, decide, and/or establish in advance.

prevent—to hinder, avert, and/or keep from occurring.

prior—before and/or preceding in time or order.

probability—a quantitative representation of a likelihood of an occurrence.

product—something produced by human and/or mechanical effort.

project—to calculate, estimate, or predict.

provide—to furnish, supply, give, and/or make available.

proximal—nearer with respect to a point of reference, such as a portion of an extended hand that is nearer the face.

radial—substantially perpendicular to a center of rotation and/or perpendicular to an axis of rotation, and/or pertaining to that which radiates from and/or converges to a common center.

radially—radiating substantially perpendicular to a center of rotation and/or perpendicular to an axis of rotation, and/or radiating from and/or converging to a common center, and/or having or characterized by parts so arranged or so radiating.

range—a measure of an extent of a set of values and/or an amount and/or extent of variation.

ratio—a relationship between two quantities expressed as a quotient of one divided by the other.

receive—to get as a signal, take, acquire, and/or obtain.

recommend—to suggest, praise, commend, and/or endorse.

reduce—to make and/or become lesser and/or smaller.

remove—to eliminate, remove, and/or delete, and/or to move from a place or position occupied.

repeat—to do again and/or perform again.

repeatedly—again and again; repetitively.

request—to express a desire for and/or ask for.

result—(n.) an outcome and/or consequence of a particular action, operation, and/or course; (v.) to cause an outcome and/or consequence of a particular action, operation, and/or course.

ring—a substantially toroidal object which can be imagined as having been generated by rotating a closed loop (e.g., ellipse, circle, irregular curve, polygon, etc.) about a fixed line external to the loop.

rotate—to turn about a center and/or an axis.

rotor—a rotating portion of a machine.

said—when used in a system or device claim, an article indicating a subsequent claim term that has been previously introduced.

second—a label for an element in one or more patent claims, the element other than a "first" referenced element of a similar type, but the label does not necessarily imply any type of ordering to how that "second" element or the "first" element is implemented in embodiments of the claimed subject matter.

select—to make a choice or selection from alternatives.

set—a related plurality.

share—participate in, use, enjoy, and/or or experience jointly, commonly, and/or simultaneously.

single—existing alone and/or consisting of one entity.

sleeve—an annular member and/or part.

soft iron—a ferrous material that: (1) is used in magnetic assemblies, electromagnets, and some electric motors; (2) can create a concentrated field that is as much as 50,000 times more intense than an air core; can withstand relatively high levels of magnetic field without saturating (e.g., up to 2.16 teslas at ambient temperature; and/or (3) does not remain magnetised when a magnetic field is removed.

source—an original and/or intermediate generator, transformer, and/or transmitter of electrical energy and/or a related group of such devices and/or a point at which something originates, springs into being, and/or from which it derives and/or is obtained.

species—a class of individuals and/or objects grouped by virtue of their common attributes and assigned a common name; a division subordinate to a genus.

stacked plurality—an orderly layered set of substantially identical objects.

stator—a stationary part in or about which another part (the rotor) revolves.

store—to place, hold, and/or retain data, typically in a memory.

substantially—to a great extent and/or degree.

such that—in a manner that results in.

support—to bear the weight of, especially from below.

surround—to encircle, enclose, and/or confine on several and/or all sides.

switch—(n) a mechanical, electrical, and/or electronic device that opens and/or closes circuits, completes and/or breaks an electrical path, and/or selects paths and/or circuits and/or a device that establishes a connection between disparate transmission path segments in a network (or between networks). (v) to electrically energize or de-energize.

system—a collection of mechanisms, devices, machines, articles of manufacture, processes, data, and/or instructions, the collection designed to perform one or more specific functions.

target—an object, attached to a rotor, whose motion provides an indication of the location of the axis of rotor and/or movement thereof.

that—used as the subject or object of a relative clause.

thereof—of that.

through—across, among, between, and/or in one side and out the opposite and/or another side of thrust—relating to a bearing configured to restrain displacement substantially parallel to an axis of rotation.

thrust bearing—a bearing configured to receive a thrust and/or longitudinal axially-directed force on a shaft. Mechanical examples include Kingsbury thrust bearings, spherical roller bearings, angular contact bearings, etc.

to—a preposition adapted for use for expressing purpose.

transform—to change in measurable: form, appearance, nature, and/or character.

transmit—to send as a signal, provide, furnish, and/or supply.

treatment—an act, manner, or method of handling and/or dealing with someone and/or something.

upon—immediately or very soon after; and/or on the occasion of.

upper—in a high position relative to something else and/or greater in magnitude in relation to something else.

use—to put into service.

via—by way of and/or utilizing.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

with—accompanied by.

with regard to—about, regarding, relative to, and/or in relation to.

with respect to—about, regarding, relative to, and/or in relation to.

within—inside the limits of.

wound—wrapped zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:

any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A machine comprising:
a thrust bearing that comprises:
  a soft iron stator configured to operably partially surround a thrust disk while operably allowing the thrust disk to rotate within the stator;
  an electromagnetic coil attached to, embedded in, or partially surrounded by the stator, the coil configured to operably encircle the thrust disk; and
  at least one permanent magnetic ring attached to, embedded in, or partially surrounded by the stator, the stator and configured to operably surround a rotor that is coupled to the thrust disk;
wherein:
  the soft iron stator is defined by an upper portion and a lower portion that is attached to or integral with the upper portion;
  an upper gap is operably defined between the upper portion and the thrust disk;
  a lower gap is operably defined between the lower portion and the thrust disk;
  each of the at least one permanent magnetic ring is configured to operably generate a permanent magnetic flux path that passes through at least one of the upper gap and the lower gap;
  the electromagnetic coil is configured to operably generate an electromagnetic flux path that passes through the upper gap and through the lower gap; and
  the thrust bearing is configured to operably position the electromagnetic flux path substantially coincidently with each of the at least one permanent magnetic flux paths.

2. The machine of claim 1, further comprising:
the thrust disk.

3. The machine of claim 1, further comprising:
the rotor.

4. The machine of claim 1, further comprising:
a power source configured to operably provide a switchably bi-directional current to the coil.

5. The machine of claim 1, wherein:
each of the at least one permanent magnetic rings is located partially distal in the stator with respect to the coil, such that the upper gap comprises a proximal upper gap portion and a distal upper gap portion.

6. The machine of claim 1, wherein:
each of the at least one permanent magnetic rings is located adjacent to the coil.

7. The machine of claim 1, wherein:
each of the at least one permanent magnetic rings is located in the stator in a position configured to operably cause the electromagnetic flux path to be substantially co-incident with each of the at least one permanent magnetic paths.

8. The machine of claim 1, wherein:
the electromagnetic flux path operably passes through each of the at least one permanent magnetic rings.

9. The machine of claim 1, wherein:
the upper gap and the lower gap are substantially filled by a fluid.

10. The machine of claim 1, wherein:
the upper gap and the lower gap are substantially filled by a non-magnetic sleeve.

11. The machine of claim 1, wherein:
the upper gap has a non-magnetic portion between the soft iron portion of the upper portion of the stator and the permanent magnetic ring and the lower gap has a non-magnetic portion between the soft iron portion of the lower portion of the stator and the permanent magnetic ring.

12. A machine comprising:
a radial bearing that comprises:
 a stator comprising:
  a soft iron back;
  a plurality of radial electromagnetic poles;
  a plurality of electromagnetic coils, each electromagnetic coil encircling a corresponding electromagnetic pole from the plurality of electromagnetic poles;
  a plurality of permanent magnet poles, each permanent magnet pole incorporating a permanent magnet into an end thereof;
 wherein:
  the stator is configured to operably at least partially surround a soft iron cylindrical target coupled to a rotor while operably allowing the target to rotate within the stator;
  the back comprises a stacked plurality of laminations;
  a radial gap is operably defined between back and the target;
  each of the plurality of electromagnetic coils is configured to operably generate an electromagnetic flux path through the corresponding electromagnetic pole, the back, the radial gap and the target;
  each of the plurality of permanent magnets is configured to operably generate a permanent magnet flux path through the corresponding permanent magnet pole, the back, the radial gap and the target;
  the radial bearing is configured to operably position at least one of the electromagnetic flux paths substantially coincidently with at least one of the permanent magnetic flux paths.

13. The machine of claim 12, further comprising:
the rotor.

14. The machine of claim 12, further comprising:
a plurality of power sources, each configured to operably provide a switchably bi-directional current to a corresponding one or more electromagnetic coils from the plurality of electromagnetic coils.

15. The machine of claim 12, wherein:
a radially opposing pair of electromagnetic coils from the plurality of electromagnetic coils is configured to operably share a single power source that is configured to provide a switchably bi-directional current.

16. The machine of claim 12, wherein:
the plurality of electromagnetic poles and the plurality of permanent magnet poles are located in a single axial plane.

17. The machine of claim 12, wherein:
the plurality of electromagnetic poles are wound around the iron back.

\* \* \* \* \*